(12) United States Patent
Herbst et al.

(10) Patent No.: US 10,651,685 B1
(45) Date of Patent: May 12, 2020

(54) SELECTIVE ACTIVATION OF A WIRELESS TRANSMITTER DEVICE

(71) Applicant: Apple Inc., Cupertino, CA (US)

(72) Inventors: Steven G. Herbst, Cupertino, CA (US); Todd K. Moyer, Cupertino, CA (US); Eric S. Jol, Cupertino, CA (US); Christopher S. Graham, Cupertino, CA (US); Christopher M. Pinciuc, Cupertino, CA (US); Brandon R. Garbus, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 121 days.

(21) Appl. No.: 15/273,566

(22) Filed: Sep. 22, 2016

Related U.S. Application Data

(60) Provisional application No. 62/235,253, filed on Sep. 30, 2015.

(51) Int. Cl.
| | |
|---|---|
| *H02J 50/10* | (2016.01) |
| *H02J 50/12* | (2016.01) |
| *H02J 50/40* | (2016.01) |
| *H02J 50/70* | (2016.01) |
| *H02J 50/90* | (2016.01) |
| *H02J 7/02* | (2016.01) |

(52) U.S. Cl.
CPC .............. *H02J 50/12* (2016.02); *H02J 7/025* (2013.01); *H02J 50/40* (2016.02); *H02J 50/90* (2016.02)

(58) Field of Classification Search
USPC .......................................................... 307/104
See application file for complete search history.

(56) References Cited

U.S. PATENT DOCUMENTS

| | | |
|---|---|---|
| 3,502,809 A | 3/1970 | Dickey |
| 4,785,136 A | 11/1988 | Mollet |
| (Continued) | | |

FOREIGN PATENT DOCUMENTS

| | | |
|---|---|---|
| CN | 101202277 | 6/2008 |
| CN | 104347259 | 2/2015 |
| (Continued) | | |

OTHER PUBLICATIONS

U.S. Appl. No. 15/422,345, filed Feb. 1, 2017, Qiu et al.
U.S. Appl. No. 15/474,569, filed Mar. 30, 2017, Jain et al.

*Primary Examiner* — Hal Kaplan
*Assistant Examiner* — Xuan Ly
(74) *Attorney, Agent, or Firm* — Brownstein Hyatt Farber Schreck, LLP

(57) ABSTRACT

A wireless transmitter device is configurable and operable to transfer energy to multiple receiver devices at the same time. The transmitter device includes at least one layer of discrete transmitter coils. The wireless transmitter device is configured to enable one or more sections of a charging surface to transfer energy by selectively choosing one or more discrete transmitter coils in the wireless transmitter device based on the position of the receiver device on the charging surface. The size and shape of each section of the charging surface that is used to transfer energy to a receiver device can change dynamically based on each receiver device. Additionally, the process of transferring energy to each receiver device may be adjusted during energy transfer based on conditions specific to each receiver device.

20 Claims, 13 Drawing Sheets

(56) References Cited

U.S. PATENT DOCUMENTS

| | | |
|---|---|---|
| 4,871,220 A | 10/1989 | Kohin |
| 5,373,102 A | 12/1994 | Ehrlich et al. |
| 5,384,575 A | 1/1995 | Wu |
| 5,496,966 A | 3/1996 | Hightower et al. |
| 5,545,844 A | 8/1996 | Plummer, III |
| 5,563,614 A | 10/1996 | Alden |
| 5,760,584 A | 6/1998 | Frederick |
| 6,144,512 A | 11/2000 | Eden |
| 6,269,247 B1 | 7/2001 | Chiodini |
| 6,449,181 B1 | 9/2002 | Rieger et al. |
| 6,492,587 B1 | 12/2002 | Yoshinaga |
| 6,724,950 B2 | 4/2004 | Byrne |
| 6,768,051 B2 | 7/2004 | Wiltshire |
| 6,864,419 B2 | 3/2005 | Lovens |
| 6,927,574 B2 | 8/2005 | Young |
| 7,035,087 B2 | 4/2006 | Tan |
| 7,068,140 B2 | 6/2006 | Chou |
| 7,170,363 B2 | 1/2007 | Wiltshire |
| 7,466,077 B2 | 12/2008 | Joo et al. |
| 7,639,206 B2 | 12/2009 | Behdad |
| 7,679,205 B1 | 3/2010 | Burns |
| 7,705,591 B2 | 4/2010 | Geren et al. |
| 7,732,038 B2 | 6/2010 | Naito et al. |
| 7,737,370 B2 | 6/2010 | Aoyama et al. |
| 7,791,311 B2 | 9/2010 | Sagoo |
| 7,906,936 B2 | 3/2011 | Azancot et al. |
| 7,948,208 B2 | 5/2011 | Partovi et al. |
| 7,948,781 B2 | 5/2011 | Esaka et al. |
| 7,952,322 B2 | 5/2011 | Partovi et al. |
| 8,013,568 B2 | 9/2011 | Park et al. |
| 8,050,063 B2 | 11/2011 | Wagoner et al. |
| 8,101,931 B2 | 1/2012 | Blandford, III |
| 8,115,448 B2 | 2/2012 | John |
| 8,169,185 B2 | 5/2012 | Partovi et al. |
| 8,193,769 B2 | 6/2012 | Azancot et al. |
| 8,262,244 B2 | 9/2012 | Metcalf |
| 8,338,990 B2 | 12/2012 | Baarman et al. |
| 8,421,274 B2 | 4/2013 | Sun et al. |
| 8,436,317 B1 | 5/2013 | Chen |
| 8,531,153 B2 | 9/2013 | Baarman et al. |
| 8,587,154 B2 * | 11/2013 | Fells ............... H01F 38/14 307/104 |
| 8,629,652 B2 | 1/2014 | Partovi et al. |
| 8,629,654 B2 | 1/2014 | Partovi et al. |
| 8,723,053 B2 | 5/2014 | Winch |
| 8,729,734 B2 | 5/2014 | Widmer et al. |
| 8,760,113 B2 | 6/2014 | Keating et al. |
| 8,779,745 B2 | 7/2014 | Brown |
| 8,810,196 B2 | 8/2014 | Ettes et al. |
| 8,836,276 B2 | 9/2014 | Prescott |
| 8,838,022 B2 | 9/2014 | Dobyns |
| 8,890,470 B2 | 11/2014 | Partovi |
| 8,896,264 B2 | 11/2014 | Partovi |
| 8,901,881 B2 | 12/2014 | Partovi |
| 8,928,284 B2 | 1/2015 | Carobolante |
| 8,947,047 B2 | 2/2015 | Partovi et al. |
| 8,947,892 B1 | 2/2015 | Lam |
| 9,001,031 B2 | 4/2015 | Lo et al. |
| 9,024,576 B2 | 5/2015 | Maenpaa |
| 9,025,143 B2 | 5/2015 | Hahn |
| 9,041,152 B2 | 5/2015 | Luo et al. |
| 9,065,423 B2 | 6/2015 | Ganem et al. |
| 9,071,062 B2 | 6/2015 | Whitehead |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,124,126 B2 | 9/2015 | Ichikawa |
| 9,153,998 B2 | 10/2015 | Mayo |
| 9,161,484 B2 | 10/2015 | Baarman et al. |
| 9,171,555 B2 | 10/2015 | Meloche |
| 9,177,716 B2 | 11/2015 | Goto |
| 9,178,369 B2 | 11/2015 | Partovi |
| 9,209,627 B2 | 12/2015 | Baarman et al. |
| 9,217,323 B2 | 12/2015 | Clark |
| 9,276,437 B2 | 3/2016 | Partovi et al. |
| 9,281,759 B2 | 3/2016 | Lee et al. |
| 9,300,147 B2 | 3/2016 | Lee et al. |
| 9,356,659 B2 | 5/2016 | Partovi |
| 9,497,894 B1 | 11/2016 | Ramsey |
| 9,548,158 B2 | 1/2017 | Groves et al. |
| 9,577,460 B2 | 2/2017 | Park |
| 9,620,983 B2 | 4/2017 | Abdelmoneum et al. |
| 9,643,507 B2 | 5/2017 | Scarlatti et al. |
| 9,711,272 B2 | 7/2017 | Hassan-Ali et al. |
| 9,726,518 B2 | 8/2017 | Widmer et al. |
| 9,735,628 B2 | 8/2017 | Efe et al. |
| 9,748,326 B2 | 8/2017 | Yen et al. |
| 9,831,686 B2 | 11/2017 | Kohara et al. |
| 9,862,282 B2 | 1/2018 | Boser et al. |
| 9,893,553 B2 | 2/2018 | Pudipeddi et al. |
| 9,905,360 B2 | 2/2018 | Muntean et al. |
| 9,917,479 B2 | 3/2018 | Bronson et al. |
| 10,044,232 B2 | 8/2018 | Crosby et al. |
| 10,090,709 B2 | 10/2018 | Matsumoto et al. |
| 10,277,442 B2 | 4/2019 | Kim et al. |
| 10,477,741 B1 | 11/2019 | Bae et al. |
| 2002/0137473 A1 | 9/2002 | Jenkins |
| 2004/0021376 A1 | 2/2004 | Beulich |
| 2008/0067914 A1 | 3/2008 | Kim et al. |
| 2009/0052721 A1 | 2/2009 | Dabrowski |
| 2010/0015918 A1 | 1/2010 | Liu et al. |
| 2011/0050164 A1 | 3/2011 | Partovi et al. |
| 2011/0164471 A1 | 7/2011 | Baarman |
| 2011/0169770 A1 | 7/2011 | Mishina et al. |
| 2011/0221385 A1 | 9/2011 | Partovi et al. |
| 2012/0104997 A1 | 5/2012 | Carobolante |
| 2012/0139358 A1 | 6/2012 | Teggatz et al. |
| 2012/0198364 A1 | 8/2012 | Bornheimer et al. |
| 2013/0043734 A1 | 2/2013 | Stone et al. |
| 2013/0093388 A1 | 4/2013 | Partovi |
| 2013/0099563 A1 | 4/2013 | Partovi et al. |
| 2013/0119773 A1 * | 5/2013 | Davis ............... H02J 5/005 307/104 |
| 2013/0260677 A1 | 10/2013 | Partovi |
| 2013/0271069 A1 | 10/2013 | Partovi |
| 2013/0285604 A1 | 10/2013 | Partovi |
| 2013/0285605 A1 | 10/2013 | Partovi |
| 2013/0300204 A1 * | 11/2013 | Partovi ............... H01F 38/14 307/104 |
| 2014/0035383 A1 | 2/2014 | Riehl |
| 2014/0103873 A1 | 4/2014 | Partovi et al. |
| 2014/0132210 A1 | 5/2014 | Partovi |
| 2014/0191568 A1 | 7/2014 | Partovi |
| 2014/0306654 A1 | 10/2014 | Partovi |
| 2014/0354279 A1 | 12/2014 | Dumoulin et al. |
| 2015/0043424 A1 | 2/2015 | Mitchell |
| 2015/0130412 A1 | 5/2015 | Partovi |
| 2015/0288193 A1 | 10/2015 | Crosby et al. |
| 2015/0303707 A1 | 10/2015 | McCauley et al. |
| 2015/0318710 A1 | 11/2015 | Lee et al. |
| 2015/0333530 A1 | 11/2015 | Moyer et al. |
| 2015/0333562 A1 | 11/2015 | Nam et al. |
| 2016/0036261 A1 | 2/2016 | Lenive |
| 2016/0064137 A1 | 3/2016 | Perez et al. |
| 2016/0172894 A1 | 6/2016 | Khripkov et al. |
| 2016/0181853 A1 | 6/2016 | Yang et al. |
| 2016/0196943 A1 | 7/2016 | Jarrahi et al. |
| 2016/0284465 A1 | 9/2016 | Maniktala |
| 2016/0372948 A1 | 12/2016 | Kvols |
| 2017/0092409 A1 | 3/2017 | Graham |
| 2017/0093199 A1 | 3/2017 | Pinciuc et al. |
| 2017/0279305 A1 | 9/2017 | Staring et al. |
| 2017/0353046 A1 | 12/2017 | Chen et al. |
| 2018/0062442 A1 | 3/2018 | Qiu et al. |
| 2018/0198318 A1 | 7/2018 | Jain et al. |
| 2018/0226822 A1 | 8/2018 | Seo et al. |
| 2018/0343042 A1 | 11/2018 | Luzinski et al. |

(56) References Cited

U.S. PATENT DOCUMENTS

2019/0058348 A1 2/2019 Wang et al.
2019/0319475 A1 10/2019 Pinciuc et al.

FOREIGN PATENT DOCUMENTS

| EP | 2211438 | | 7/2010 |
|----|---------|---|--------|
| EP | 2256895 | | 12/2010 |
| JP | WO2008032746 | * | 3/2008 |
| JP | 5510608 | | 6/2014 |
| KR | 20080081480 | | 9/2008 |
| WO | WO 08/032746 | | 3/2008 |
| WO | WO 09/081126 | | 7/2009 |

* cited by examiner

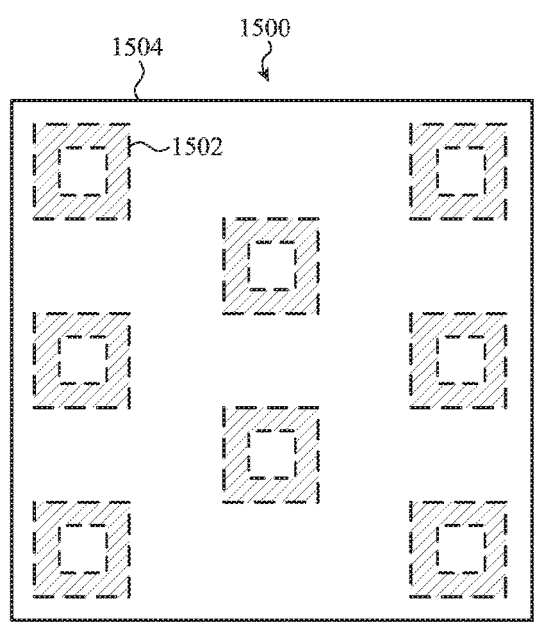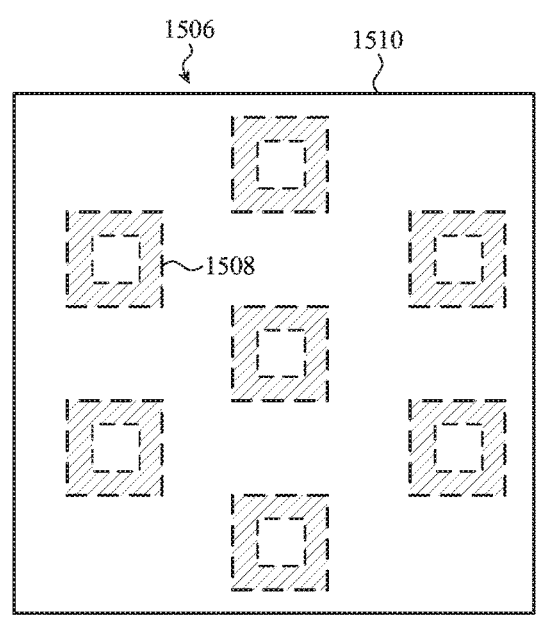
*FIG. 15A*           *FIG. 15B*

SELECTIVE ACTIVATION OF A WIRELESS TRANSMITTER DEVICE

CROSS-REFERENCE TO RELATED APPLICATION

This application claims the benefit under 35 U.S.C. § 119(e) of U.S. Provisional Patent Application No. 62/235,253, filed on Sep. 30, 2015, and entitled "Configurable Wireless Transmitter Device," which is incorporated by reference as if fully disclosed herein.

FIELD

The described embodiments relate generally to wireless energy transfer. More particularly, the present embodiments relate to a transmitter device that is configurable to operate with one or more receiver devices.

BACKGROUND

Some electronic devices are configured to receive energy or power wirelessly. The user may place the electronic device on a charging surface of a wireless charging or transmitter device to transfer energy from the transmitter device to the electronic device. The transmitter device transfers energy to the electronic device through inductively coupling between a transmitter coil in the transmitter device and a receiver coil in the electronic device.

In some instances, a wireless transmitter device is constructed to only transfer energy to a particular receiver device. This can increase the cost to a user who uses wireless energy transfer for multiple electronic devices. Because each electronic device may operate only with a particular charging device, a user may be required to purchase multiple charging devices.

SUMMARY

A wireless transmitter device is configurable and operable to transfer energy to one receiver device or to two or more receiver devices at the same time. The transmitter device includes multiple discrete transmitter coils in or below a charging surface. The transmitter device is configured to enable one or more sections of a charging surface to transfer energy to one or more receiver coils by selectively energizing one or more discrete transmitter coils in the transmitter device based on the position of the receiver device on the charging surface. The size and shape of each section of the charging surface that is used to transfer energy to a receiver device can change dynamically based on each receiver device. Additionally, the process of transferring energy to each receiver device may be adjusted during energy transfer based on conditions specific to each receiver device.

In one aspect, a wireless transmitter device can include a substrate that includes multiple discrete transmitter coils. A processing device is configured to select a first transmitter coil based on a position of a first receiver device on a charging surface of the wireless transmitter device and to determine at least one drive signal characteristic for a first drive signal associated with the first transmitter coil. The drive signal characteristics include, but are not limited to, a phase of the drive signal, a frequency of the drive signal, and an amplitude of the drive signal. Drive circuitry is operably connected to the processing device and to the first transmitter coil. The processing device is configured to cause the drive circuitry to provide the first drive signal to the first transmitter coil to transfer energy from the first transmitter coil to a first receiver coil in the first receiver device.

The processing device may also be configured to select a second transmitter coil based on a position of a second receiver device on the charging surface, determine at least one drive signal characteristic for a second drive signal associated with the second transmitter coil, and to cause the drive circuitry to provide the second drive signal to the second transmitter coil to transfer energy from the second transmitter coil to a second receiver coil in the second receiver device.

In one embodiment, the discrete transmitter coils can be arranged in a pattern in or below the substrate. By selectively energizing one or more transmitter coils, only a section of the charging surface is used to transfer energy to a receiver device. Additionally, multiple sections of the charging surface can be used to transfer energy to different receiver devices by selectively conducting drive signals through one or more transmitter coils associated with each section.

The magnetic flux associated with each magnetic field can be tailored for a particular receiver device. Additionally, when a magnetic field is created near another magnetic field, the two magnetic fields (or portions of the two magnetic fields) interact and alter the direction and magnitude of the net magnetic field. Thus, in some embodiments magnetic flux can be steered toward a particular section of the charging surface and/or a receiver coil. Steering the magnetic fields associated with two or more transmitter coils permits a receiver device to receive energy from a section of the charging surface regardless of the position and orientation of a receiver device on the charging surface (e.g., if the receiver coil is perpendicular or parallel to the charging surface).

In another aspect, a wireless transmitter device can include a first substrate including a plurality of transmitter coils arranged in a pattern and a second substrate positioned below the first substrate and including drive circuitry operably connected to the plurality of transmitter coils and configured to provide drive signals to the plurality of transmitter coils. A via is formed from the first substrate to the second substrate to provide a conductive connector between the plurality of transmitter coils and the drive circuitry. A processing device is operably connected to the drive circuitry and configured to select a transmitter coil in the plurality of transmitter coils based on a position of a receiver device on a charging surface of the wireless transmitter device and cause the drive circuitry to provide the drive signal to the selected transmitter coil to transfer energy from the selected transmitter coil to a receiver coil in the receiver device.

In yet another aspect, a method of operating a wireless transmitter device may include detecting a position of a first receiver device on a charging surface of the wireless transmitter device, selecting a first transmitter coil in a plurality of transmitter coils based on the position of the first receiver device on the charging surface, and providing a first drive signal to the first transmitter coil to transfer energy from the first transmitter coil to a first receiver coil in the first receiver device. The method further includes detecting a position of a second receiver device on the charging surface of the wireless transmitter device, selecting a second transmitter coil in the plurality of transmitter coils based on the position of the second receiver device on the charging surface, and providing a second drive signal to the second transmitter coil to transfer energy from the second transmitter coil to a second receiver coil in the second receiver device. In some embodiments, during energy transfer, the first drive signal can be adjusted to modify the transfer of energy to the first receiver device.

In another aspect, a method of operating a wireless transmitter device can include determining if a transfer of energy to a first receiver device has a higher priority than a transfer of energy to a second receiver device, and if the transfer of energy to the first receiver device has higher priority, selecting a first transmitter coil in a plurality of transmitter coils positioned in or below a charging surface of the transmitter device based on a position of the first receiver device on the charging surface. A drive signal can be applied to the first transmitter coil to transfer energy from the first transmitter coil to a receiver coil in the first receiver device. After the process of transferring energy to the first receiver device is in process for a given period of time or is complete, a second transmitter coil may be selected in the plurality of transmitter coils based on a position of the second receiver device on the charging surface. A second drive signal may be applied to the second transmitter coil to transfer energy from the second transmitter coil to a receiver coil in the second receiver device. In some embodiments, one or more drive signal characteristics of each drive signal(s) can be determined based on the priority of each receiver device.

BRIEF DESCRIPTION OF THE DRAWINGS

The disclosure will be readily understood by the following detailed description in conjunction with the accompanying drawings, wherein like reference numerals designate like structural elements, and in which:

FIGS. 15A-15B show one example of two layers of transmitter coils; and

DETAILED DESCRIPTION

Figure 1:
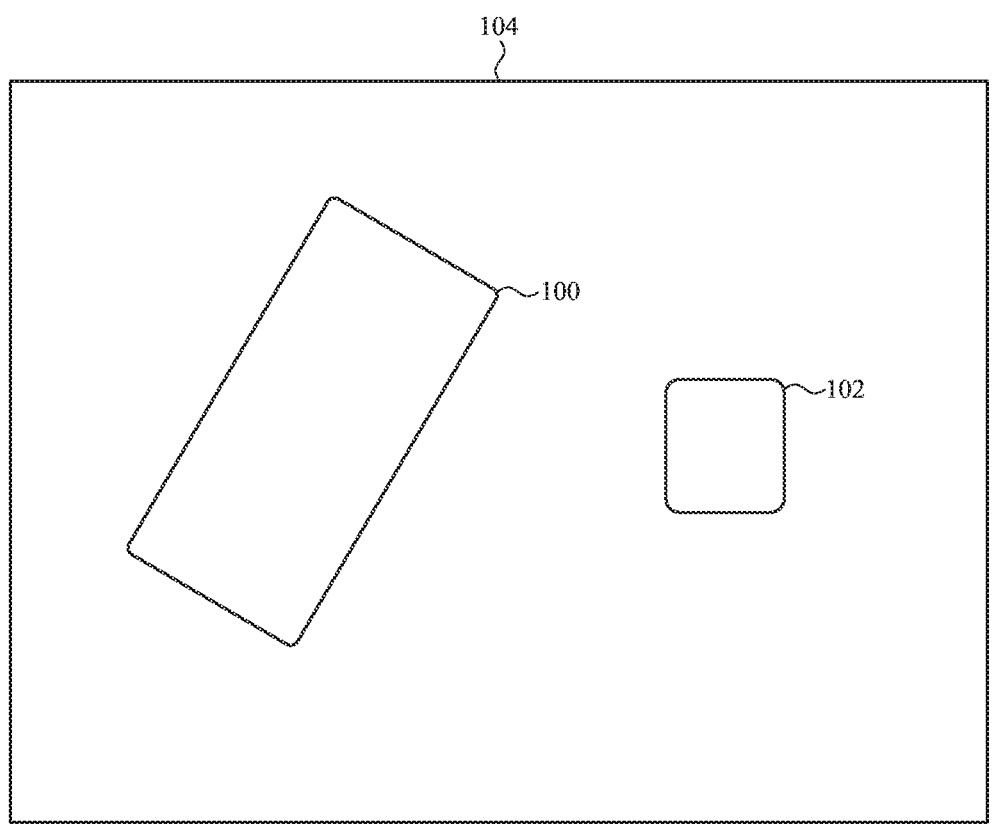
FIG. 1 shows a plan view of two receiver devices on a charging surface of a wireless transmitter device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a transmitter device in a wireless energy transfer system. The wireless transmitter device can be configured to transfer energy to one receiver device or to multiple receiver devices at the same time. The transmitter device is configured to enable one or more sections of the charging surface to transfer energy by selecting one or more discrete transmitter coils in the transmitter device based on the position of a receiver device on the charging surface. Enabling only a section of a charging surface for energy transfer allows the transfer of energy to a receiver device to be tailored for that specific receiver device based on the energy transfer requirements of the receiver device. The size and shape of each section of the charging surface that is used to transfer energy to a receiver device can change dynamically based on each receiver device.

Additionally, the transmitter device may be configured to transfer energy to a receiver device regardless of the position and orientation of the receiver device on the charging surface of the transmitter device. For example, in some instances a receiver device may be positioned on the charging surface such that a receiver coil in the receiver device is parallel to the charging surface. In other situations, a receiver device may be positioned on the charging surface such that a receiver coil in the receiver device is perpendicular to the charging surface or at an angle with respect to the charging surface. The transmitter device is configured to enable one or more sections of the charging surface to transfer energy by selectively choosing or configuring one or more transmitter coils in the transmitter device based on the position of a receiver device on the charging surface.

In some embodiments, energy transfer may be optimized for different receiver devices that are receiving energy from a transmitter device at the same time. A first set of discrete transmitter coils can be energized to transfer energy to a first receiver device and a second set of discrete transmitter coils can be energized to transfer energy to a second receiver device. Each set of transmitter coils may include one or more discrete transmitter coils. One or more drive signal characteristics of the AC drive signal received by each transmitter coil in the first set may be chosen to optimize the energy transfer process for the first receiver device. For example, the one or more drive signal characteristics of each AC drive signal can be selected to produce a net magnetic field or flux that is normal to the receiver coil. The drive signal characteristic(s) of each AC drive signal may be chosen to steer the net magnetic field toward the receiver coil so the net magnetic field is normal to the receiver coil. The one or more drive signal characteristics of an AC drive signal can include (but are not limited to) the frequency, the phase, and the amplitude of the AC drive signal. Similarly, one or more drive signal characteristics of the AC drive signal received by each transmitter coil in the second set may be chosen to optimize the energy transfer process for the second receiver device.

In some embodiments, the process of transferring energy to each receiver device may be adjusted during energy transfer based on conditions specific to each receiver device. For example, when a transmitter device is transferring energy contemporaneously to two receiver devices, the battery in a first receiver device may be fully charged before the battery in a second receiver device is fully charged. The one or more transmitter coils that are transferring energy to the first receiver device can stop transferring energy while the one or more transmitter coils that are transferring energy to the second receiver device continue to transfer energy. As another example, one receiver device may be able to receive a greater amount of energy compared to the amount of energy another receiver device can receive.

In some embodiments, energy transfer to multiple receiver devices may be prioritized based on one or more conditions of the receiver devices. For example, a first receiver device may receive energy, or receive a greater amount of energy, than a second receiver device because the charge level of the battery in the first receiver device is lower than the charge level of the battery in the second receiver device. Alternatively, a battery in a first receiver device may be a fast charging battery while the battery in the second receiver device is not a fast charging battery. The transmitter device may transfer energy to the first receiver device until the fast charging battery is fully charged, and once the fast charging battery is fully charged, begin transferring energy to the second receiver device. Alternatively, a user can prioritize his or her receiver devices so that when two receiver devices are on a charging surface of a transmitter device, the receiver device with the highest priority receives a greater amount of energy than the second receiver device.

A wireless transmitter device can include discrete transmitter coils formed within a charging surface and/or in one or more layers below a charging surface. The transmitter coils can be arranged in any given pattern. As one example, the transmitter coils can be arranged in a two dimensional array of transmitter coils (e.g., rows and columns). In some embodiments, one or more sections of a charging surface may be associated with areas that do not include transmitter coils. In other words, one or more sections of a charging surface may not be able to transfer energy because transmitter coils are not positioned below those sections.

The discrete transmitter coils are individually addressable such that different drive signals may be received by different transmitter coils. Thus, each transmitter coil may be independently energized to selectively enable one or more sections of a charging surface to transfer energy. The magnetic field generated around each selected transmitter coil can couple inductively with a receiver coil positioned adjacent to (e.g., at least partially over) the selected section to transfer energy from the transmitter device to the receiver device.

In some embodiments, energy can be transferred from the transmitter device to the receiver device for wireless charging of the receiver device and/or for transmitting communication and/or control signals to the receiver device. A receiver device may transfer energy to a transmitter device to transmit communication and/or control signals to the transmitter device.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 depicts a plan view of two receiver devices on a charging surface of a wireless transmitter device. A first receiver device 100 and a second receiver device 102 are positioned on the charging surface 104. The charging surface 104 is configured to wirelessly transfer energy to the first and second receiver devices 100, 102 at the same time, at different times, or at overlapping times. For example, the charging surface 104 can transfer energy to the first and second receiver devices 100, 102 to charge a battery in each receiver device.

The requirements for transferring energy wirelessly to the first receiver device 100 can differ from the energy transfer requirements of the second receiver device 102. For example, the amount of energy that can be transferred to each receiver device can differ between the two devices, the amount of time needed to charge a battery in each receiver device may differ, and the input impedance of the load (e.g., a battery) in each receiver device can differ between the two devices. The embodiments disclosed herein provide a wireless transmitter device that can transfer energy to a receiver device or to multiple receiver devices concurrently by selectively energizing one or more discrete transmitter coils positioned in or below the charging surface 104. In this manner, only sections of the charging surface are used to transfer energy to the receiver device(s). Additionally, the magnetic field or fields can be tailored for each receiver device based on the position of a receiver device on the charging surface and the energy transfer requirements for that receiver device. For example, multiple magnetic fields can be generated and summed together to produce a net magnetic field that is normal to the receiver coil.

In the illustrated embodiment, the first receiver device 100 is shown as a cellular telephone and the second receiver device 102 as a watch. Other embodiments are not limited to these example receiver devices. A receiver device can be any electronic device that includes one or more receiver coils integrated into the electronic device. In some embodiments, one or more receiver coils can be integrated into a case that is positionable around an electronic device. Example receiver devices include, but are not limited to, a game controller, a gaming device, a tablet computing device, a digital camera, a digital music player, a speaker, a wearable health device, a remote control, and an enclosure or case that can be positioned about a portable electronic device.

Figure 2:
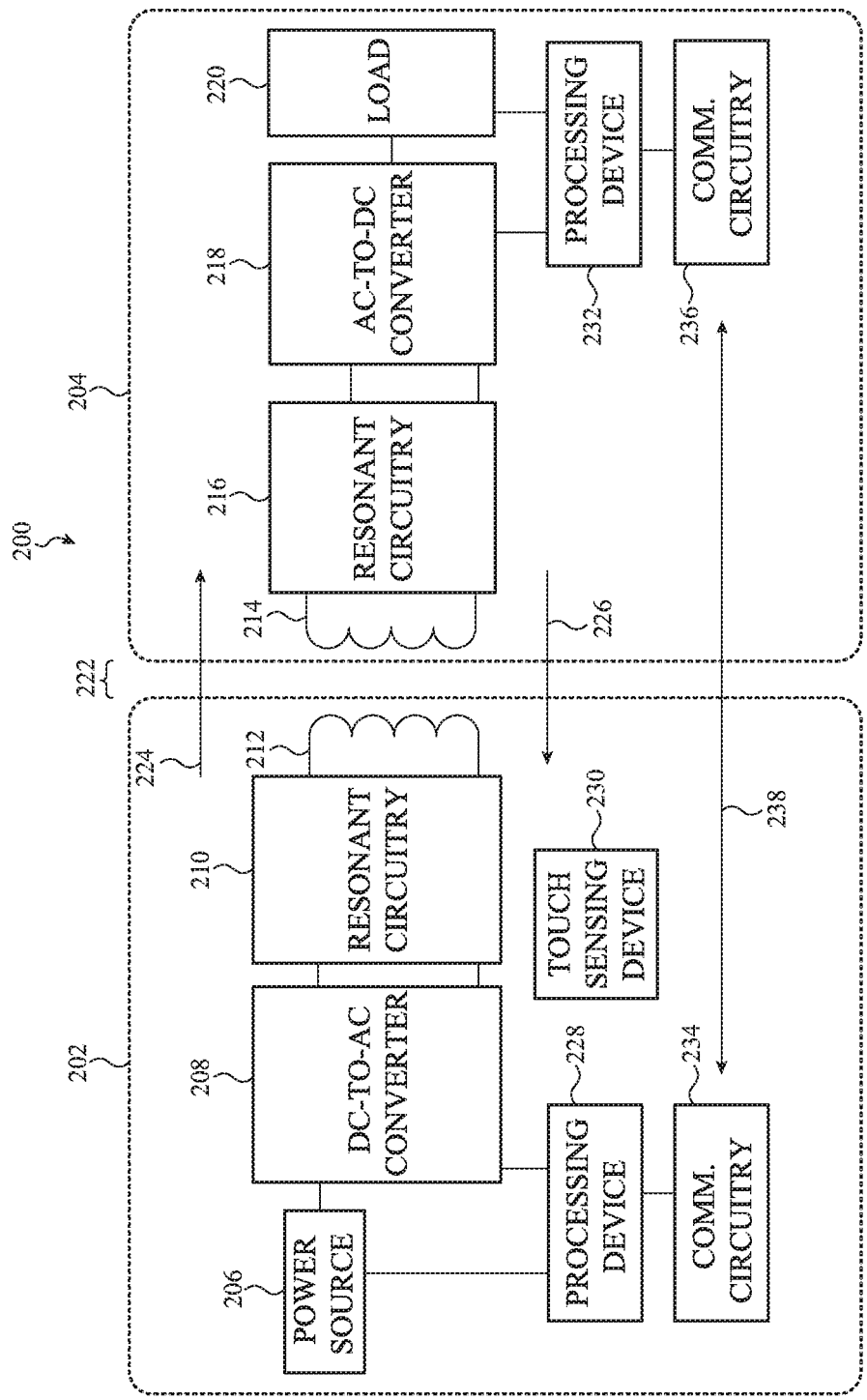
FIG. 2 shows a schematic diagram of a first example of a wireless energy transfer system.

FIG. 2 shows a schematic diagram of a first example of wireless energy transfer system. The system 200 includes a transmitter device 202 and a receiver device 204. The transmitter device 202 includes a direct current (DC) power source 206 operably connected to a DC-to-AC converter 208. As described earlier, an example power source includes, but is not limited to, one or more batteries or another electronic device that is connected to the transmitter device 202 by a connector or cord. Other embodiments may use an AC power source 206 and omit the DC-to-AC converter 208 or connect an AC-to-DC converter between the AC power source 206 and the DC-to-AC converter 208.

Any suitable type of a DC-to-AC converter 208 may be used in the transmitter device 202. For example, the DC-to-AC converter 208 can be constructed as an H bridge in one embodiment. The DC-to-AC converter 208 is operatively connected to transmitter resonant circuitry 210. In some embodiments, the power source 206, the DC-to-AC converter 208, and the transmitter resonant circuitry 210 collectively are known as a drive circuit. In other embodiments, one or more of these components may be omitted from a drive circuit. For example, a power source can be shared by multiple drive circuits.

The transmitter resonant circuitry 210 is operatively connected to a transmitter coil 212 that is selectively energized for energy transfer.

The receiver device 204 can include a receiver coil 214 operably connected to receiver resonant circuitry 216. The receiver resonant circuitry 216 is operatively connected to an AC-to-DC converter 218. Any suitable type of AC-to-DC converter may be used. For example, the AC-to-DC converter can be constructed as a diode bridge in one embodiment.

A load 220 is operably connected to the output of the AC-to-DC converter 218. The load 220 is a rechargeable battery in one embodiment. Other embodiments can use a different type of load. For example, the load may represent one or more system components that use the power received from the receiver coil 214.

The wireless energy transfer system 200 transfers power or energy through inductive coupling between the transmitter coil 212 and the receiver coil 214 (energy transfer represented by arrow 224). Essentially, energy is transferred from the transmitter coil 212 to the receiver coil 214 by conducting an alternating current (AC) or signal through the transmitter coil 212 to create a varying magnetic field. Because the signal is an alternating current, the direction of the magnetic field changes based on the direction of the AC signal. The varying magnetic field induces an AC current in the receiver coil 214. The AC signal in the receiver coil 214 is received by the AC-to-DC converter 218, which converts the AC signal into a DC signal. In embodiments where the load 220 is a rechargeable battery, the DC signal is used to charge the battery.

Additionally or alternatively, the transferred energy can be used to transmit communication signals between the transmitter and receiver devices (communication signals represented by arrow 226). For example, a receiver device may use load modulation to transfer communication signals (e.g., control and/or status data) from the receiver device to the transmitter device. As one example, a receiver device can apply a controlled pulsed load across the receiver coil, which results in an amplitude modulation of the voltage on the transmitter coil. The transmitter device (e.g., a processing device in the transmitter device) can detect and demodulate the amplitude modulation.

Additionally or alternatively, a receiver device may transfer a brief burst of energy (a "ping") to the transmitter device to inform the transmitter device of the presence of the receiver device, or a transmitter device may transfer a ping to the receiver device to determine if the receiver device is ready to receive energy. Additionally or alternatively, a transmitter device can use phase shift keying, frequency modulation and the like to transmit communication signals from the transmitter device to the receiver device.

A processing device 228 in the transmitter device 202 can be operatively connected to the power source 206 and/or the DC-to-AC converter 208. Although not shown in FIG. 2, the processing device 228 may be operatively connected to other components (e.g., a display, memory) in the transmitter device 202. The processing device 228 may control and/or monitor the power produced by the power source 206. Additionally or alternatively, the processing device 228 can control or monitor the operation of the DC-to-AC converter 208. As one example, when the DC-to-AC converter 208 is configured as an H bridge, the processing device 228 may control the opening and closing of the switches in the H Bridge.

In some embodiments, the processing device 228 can be operatively connected to a touch sensing device 230. The touch sensing device 230 may be configured to detect touch and/or pressure or force on a charging surface of the transmitter device 202. As one example, the touch sensing device 230 can detect the presence and location of an object that is in contact with the charging surface.

A processing device 232 in the receiver device 204 can be operatively connected to the AC-to-DC converter 218 and/or the load 220. Although not shown in FIG. 2, the processing device 232 may be operatively connected to other components (e.g., a sensor, memory) in the receiver device 204. The processing device 232 may control or monitor the operation of the AC-to-DC converter 218 and/or the load 220. As one example, the processing device 232 may monitor the charge level on the load 220 when the load 220 is configured as a rechargeable battery.

Communication circuitry 234, 236 may be operatively connected to the processing devices 228, 232 in the transmitter and receiver devices 202, 204, respectively. The communication circuitry 234, 236 can be used to establish a communication channel 238 between the transmitter device 202 and the receiver device 204. As described earlier, energy transfer can be used for communication between the transmitter and receiver devices. The communication channel 238 is an additional or alternate communication mechanism that is separate from the transfer of energy. The communication channel 238 can be used to convey information from the transmitter device 202 to the receiver device 204, and vice versa. The communication channel 238 may be implemented as a physical or wired link, or as a wireless link. The communication channel 238 may be configured as any suitable communication channel, such as, for example, Near Field Communication, Bluetooth, and Infrared.

Although only one power source 206, DC-to-AC converter 208, transmitter resonant circuitry 210, and transmitter coil 212 are shown in FIG. 2, a transmitter device can include multiple power sources, DC-to-AC converters, resonant circuitry, and discrete transmitter coils. Each transmitter coil can be connected to a respective DC-to-AC converter and respective resonant circuitry. Alternatively, two or more transmitter coils can share a DC-to-AC converter and resonant circuitry. The power supply may be shared by multiple DC-to-AC converters or a separate power supply can be connected to each DC-to-AC converter. The processing device 228 is operable to select one or more transmitter coils to receive an AC drive signal, and to cause a select signal to be provided to respective drive circuitry for each selected transmitter coil. Each select signal enables the selected transmitter coil(s) to transfer energy. The select signal specifies the drive signal characteristics for each drive signal associated with each selected transmitter coil. The respective drive circuitry then provides the respective drive signal to each selected transmitter coil based on the select signal for that selected transmitter coil.

Similarly, in some embodiments the receiver device 204 may include multiple receiver coils, resonant circuitry, and AC-to-DC converters. In some embodiments, a receiver device can include a conductive trace instead of, or in addition to, a receiver coil or coils. Each receiver coil or conductive trace can be connected to a respective AC-to-DC converter and respective resonant circuitry ("drive circuitry"). Alternatively, two or more receiver coils (or conductive traces) may share an AC-to-DC converter and resonant circuitry.

Figure 3:
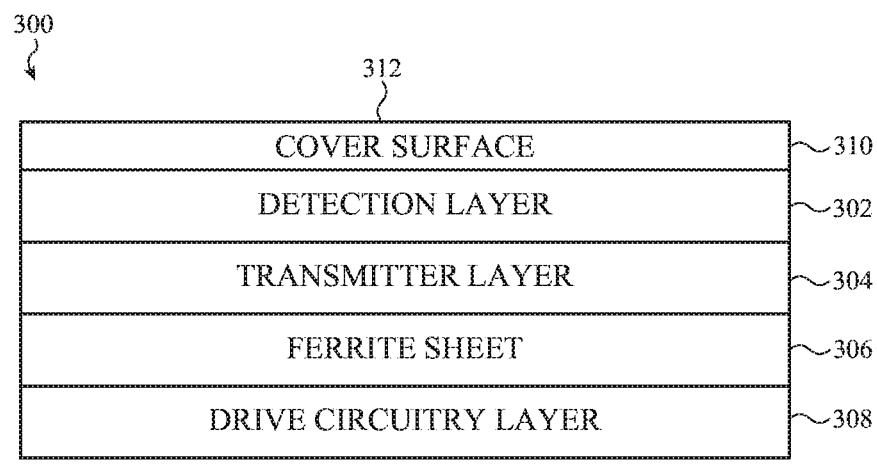
FIG. 3 shows one example of a wireless transmitter device.

FIG. 3 shows one example of a wireless transmitter device. In the illustrated embodiment, the transmitter device 300 can include a cover surface 310, a detection layer 302 positioned below the cover surface 310, one or more transmitter layers 304 positioned below the detection layer 302, a ferrite sheet 306 positioned below the transmitter layer(s) 304, and one or more layers of drive circuitry 308 positioned below the ferrite sheet 306. The cover surface 310 may act as a charging surface 312 on which a receiver device can be placed. The cover surface 310 may provide a physical barrier for the underlying layers and protect the underlying layers from damage and contaminants, such as water and dirt.

The detection layer 302 can be used to detect the presence of a receiver device and to determine the location of the receiver device on the cover surface 310. The detection layer 302 can include any suitable touch sensing technology, including capacitive touch sensing technology, optical touch sensing technology, and resistive touch sensing technology. The detection layer 302 is optional and may be omitted in some embodiments.

For example, in one embodiment the detection layer 302 includes proximity sensors and/or capacitive touch sensors that detect when an object is in contact with the cover surface 310. The location of the one or more sensors that detect the object can indicate the position of the object on the cover surface 310. In some embodiments, the transmitter device can selectively excite the section of the cover surface 310 corresponding to the location of the object for a short period of time to determine if the object is a receiver device. If the transmitter device receives an acknowledgement signal from the object in response to the excitation, the transmitter device can establish the object is a receiver device.

In another embodiment, the detection layer 302 includes optical sensors that detect the presence or absence of light. For example, a receiver device may include a light source positioned adjacent to a bottom surface of the receiver device. The light source can periodically emit one or more pulses of light when the receiver device is in contact with a surface. The pulses of light may not be visible or objectionable to a user when the pulse(s) of light are emitted toward the surface. One or more optical sensors in the transmitter device can detect the light, and the location of the one or more optical sensors can indicate the position of the receiver device on the cover surface 310.

The one or more transmitter layers 304 can each include multiple discrete transmitter coils arranged in any suitable pattern. One example pattern is a two dimensional array formed with rows and columns of discrete transmitter coils. Other embodiments can arrange the transmitter coils in a different pattern. Additionally, each transmitter coil may be formed in any suitable shape and/or dimensions.

The ferrite sheet 306 can be used as a magnetic shield to protect the drive circuitry positioned below the ferrite sheet 306 from the magnetic flux produced by one or more transmitter layers 304. The ferrite sheet 306 can have a "reflective" function to direct the magnetic fields in an upward direction toward the cover surface 310. Placing the ferrite sheet 306 below the one or more transmitter layers 304 can concentrate the magnetic flux in the area between the one or more transmitter layers 304 and a receiver coil in a receiver device. A ferrite sheet 306 is optional and may be omitted in some embodiments.

The one or more layers of drive circuitry 308 can include drive circuits that provide drive signals to the one or more transmitter layers 304. For example, a drive circuit for a transmitter coil can include a DC-to-AC converter and transmitter resonant circuitry (e.g., 208 and 210 in FIG. 2). An AC drive signal flows through at least one transmitter coil to create a varying magnetic field. As described earlier, the varying magnetic field induces a voltage in a receiver coil in the receiver device.

In some embodiments, the detection layer 302 can be formed with a flexible circuit or other suitable substrate. The one or more transmitter layers may each be formed with a printed circuit board, a flexible circuit, or other suitable substrate. Similarly, the one or more layers of drive circuitry can each be formed with a printed circuit board or other suitable substrate.

In other embodiments, the cover surface 310 and the detection layer 302 may be omitted from a wireless transmitter device. In such embodiments, the top surface of the transmitter layer 304 functions as a charging surface. One or more additional layers of transmitter coils can be positioned below the transmitter layer 304.

Other embodiments can configure the transmitter device 300 differently. The ordering or position of the layers may be different. As one example, a layer of drive circuitry can be positioned side-by-side with a transmitter layer instead of below the transmitter layer. As another example, a detection layer may be below a transmitter layer. A transmitter device may include a level of alternation between layers, such as, for example, transmitter coils in one section can be above the detection layer while the transmitter coils in another section are below the detection layer. In some embodiments, some of the layers are not formed as distinct layers. For example, the components in the detection layer may be included in a transmitter layer.

Figure 4:
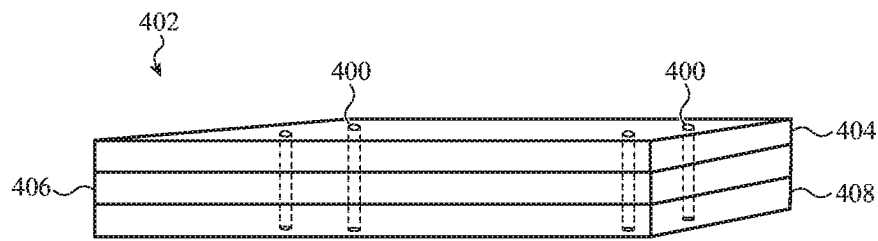
FIG. 4 shows one example of a wireless transmitter device with conductive connections between a transmitter layer and a drive circuitry layer.

In some embodiments, conductive connectors between the drive circuitry and respective transmitter coils can be created with (or in) vias formed between a transmitter layer and a respective layer of drive circuitry (see FIG. 4). The transmitter device 402 shown in FIG. 4 includes a single transmitter layer 404, a ferrite sheet 406, and a single layer of drive circuitry 408. The vias 400 are formed through ferrite sheet 406 and electrically connect a drive circuit on the layer of drive circuitry 408 to one or more transmitter coils in the transmitter layer 404.

Figure 5:
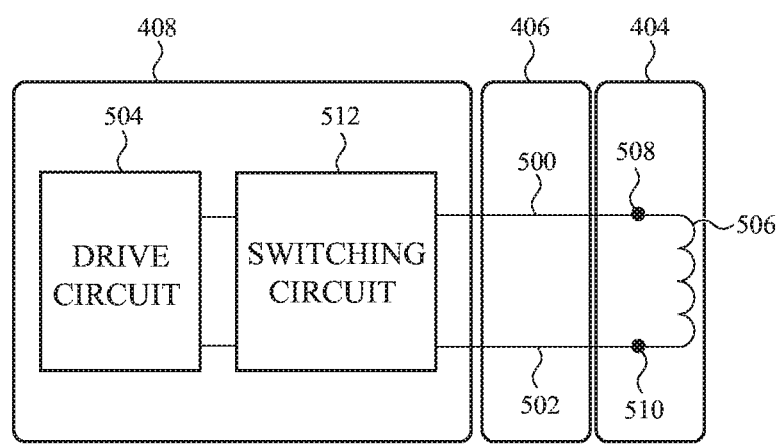
FIG. 5 shows a schematic diagram of the wireless transmitter device shown in FIG. 4.

FIG. 5 shows a schematic diagram of the wireless transmitter device shown in FIG. 4. The conductive connectors 500, 502 can be formed with or in vias to connect a drive circuit 504 to a transmitter coil 506 at locations 508, 510. In some embodiments, the drive circuit 504 only connects to the transmitter coil 506. In other embodiments, the drive circuit 504 can connect to the transmitter coil 506 and to one or more additional transmitter coils (not shown). In such embodiments, an AC drive signal can be switched from one transmitter coil to another transmitter coil by a switching circuit 512. One example of a switching circuit is a multiplexer.

Figure 6:
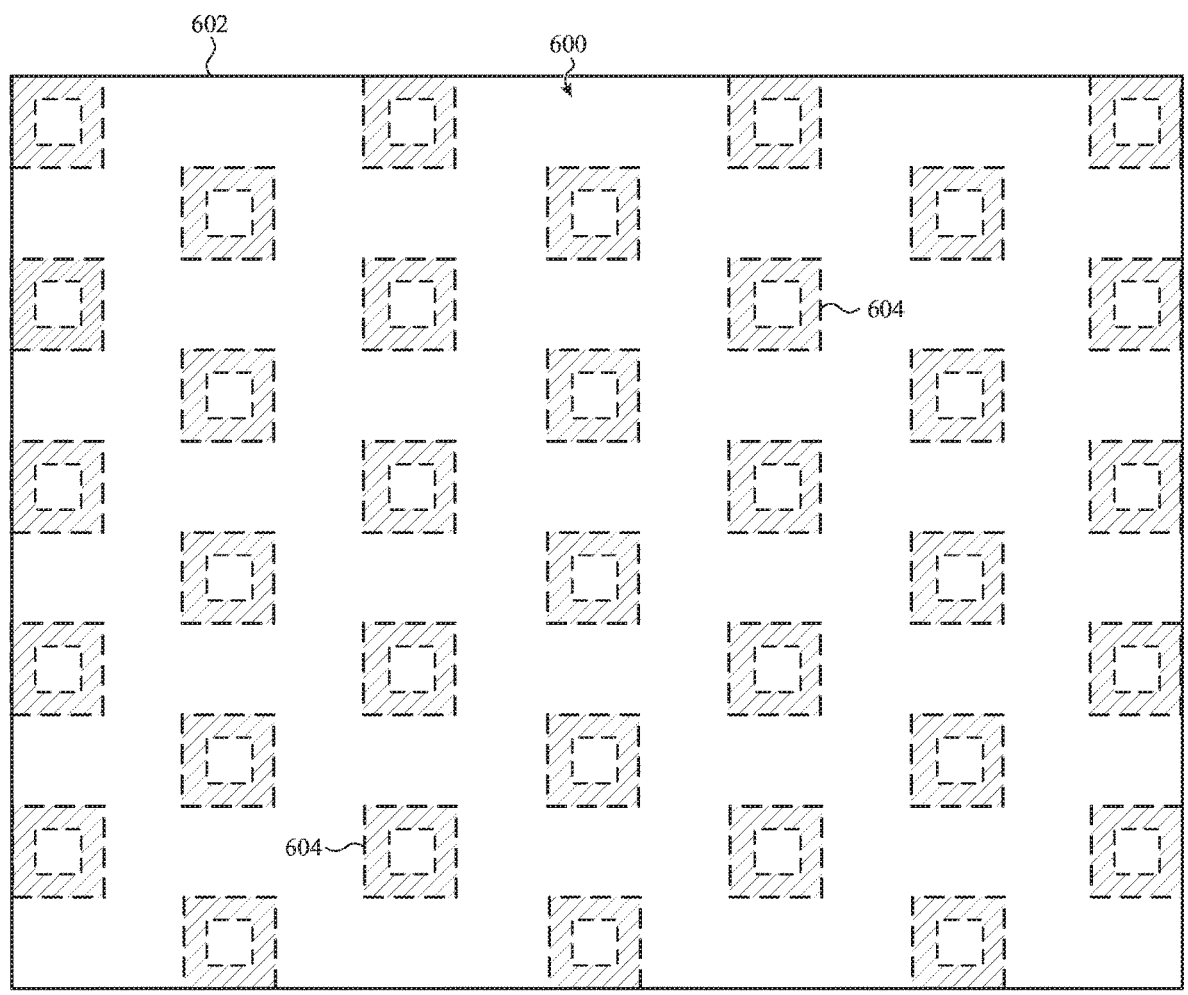
FIG. 6 shows a plan view of a wireless transmitter device that is suitable for use as the transmitter device shown in FIG. 1.

FIG. 6 shows a plan view of a wireless transmitter device that is suitable for use as the transmitter device shown in FIG. 1. An array 600 of discrete transmitter coils 604 is positioned within or below the charging surface 602. The discrete transmitter coils 604 can be constructed in any suitable shape and size. For example, in one embodiment each transmitter coil may have a symmetrical shape (e.g., a square, a circle, a hexagon). In another embodiment, each transmitter coil can have a non-symmetrical shape. In some embodiments, a portion of the transmitter coils can have the same or different symmetrical shapes while another portion of the transmitter coils have the same or different non-symmetrical shapes.

Figure 7:
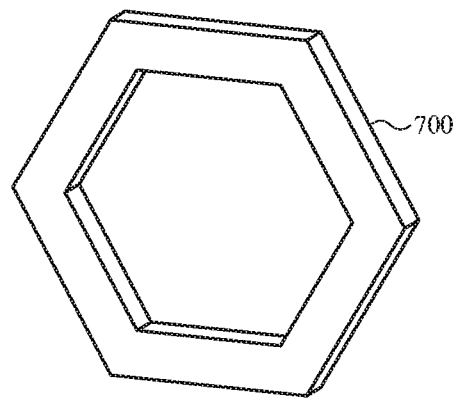
FIG. 7 shows one example transmitter coil that can be used in an array of discrete transmitter coils.
Figure 8:
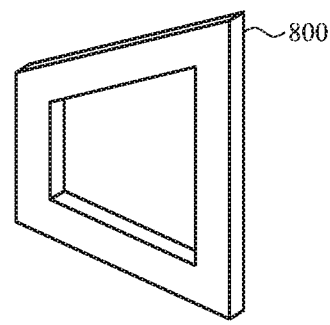
FIG. 8 shows another example transmitter coil that can be used in an array of discrete transmitter coils.
Figure 9:
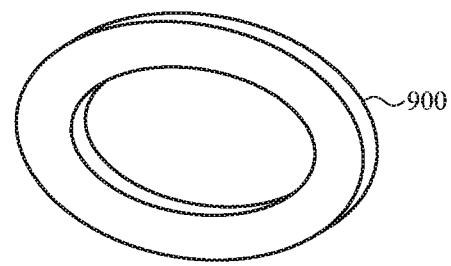
FIG. 9 shows another example transmitter coil that can be used in an array of discrete transmitter coils.

For example, FIGS. 7-9 illustrate example shapes for one or more transmitter coils that can be included in an array of transmitter coils. A transmitter coil may be formed in a hexagon shape 700, in a circular or elliptical shape 800, in a polygon shape 900, or in any other suitable symmetrical or non-symmetrical shape.

Returning to FIG. 6, each discrete transmitter coil 604 in the array 600 can be selected independently to receive an AC drive signal. The number and locations of the discrete transmitter coils 604 that receive an AC drive signal is based on the position of a receiver device on the charging surface 602. Additionally, in some embodiments one or more sections of the charging surface 602 may be associated with areas that do not include transmitter coils. In other words, one or more sections of the charging surface may not be able to transfer energy because transmitter coils are not positioned below those sections.

Figure 10:
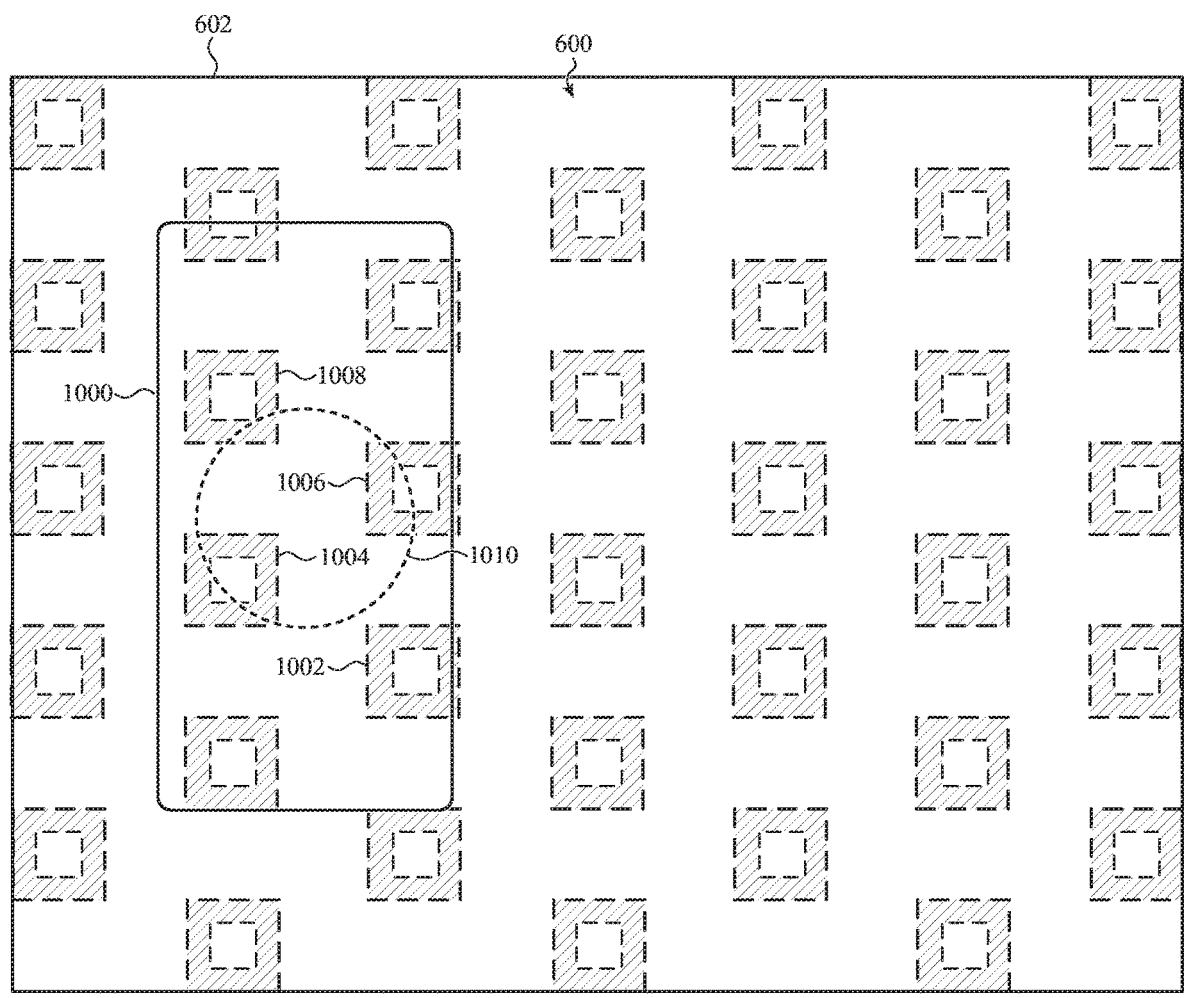
FIG. 10 shows a first plan view of a first charging surface with a first example receiver device positioned thereon.

A drive signal can flow through one or more transmitter coils in a particular section of the charging surface 602 to produce a magnetic field or magnetic fields in that particular section of the charging surface 602. FIG. 10 shows a first plan view of a first charging surface with a first example receiver device positioned thereon. In the illustrated embodiment, the receiver device 1000 (shown transparent) is positioned on the charging surface 602 as shown, one or more of the transmitter coils 1002, 1004, 1006, 1008 can be selected to receive an AC drive signal. The selected transmitter coil(s) can couple inductively with the receiver coil 1010 to transfer energy to the receiver device 1000. In this manner, only a section of the charging surface 602 is used for energy transfer.

The magnetic flux associated with each magnetic field can be tailored for a particular receiver device. The magnetic flux depends at least in part on the frequency, the phase, and the amplitude of an AC drive signal. These drive signal characteristics of an AC drive signal may be selected or adjusted to produce a given magnetic flux. Additionally, when a magnetic field is created near another magnetic field, the two magnetic fields (or portions of the two magnetic fields) interact and alter the direction and magnitude of the net magnetic field. Thus, in some embodiments magnetic flux produced by one or more transmitter coils can be steered toward a particular section of the charging surface and/or a receiver coil by the magnetic flux generated by one or more other transmitter coils. Steering the magnetic fields associated with the transmitter coil(s) permits a receiver device to receive energy from a section of the charging surface regardless of the position and orientation of a receiver device on the charging surface (e.g., if the receiver coil is perpendicular or parallel to the charging surface). Additionally, the net magnetic flux can be steered toward the receiver coil to produce a net magnetic field that is normal to the receiver coil for optimum energy transfer.

Figure 11:
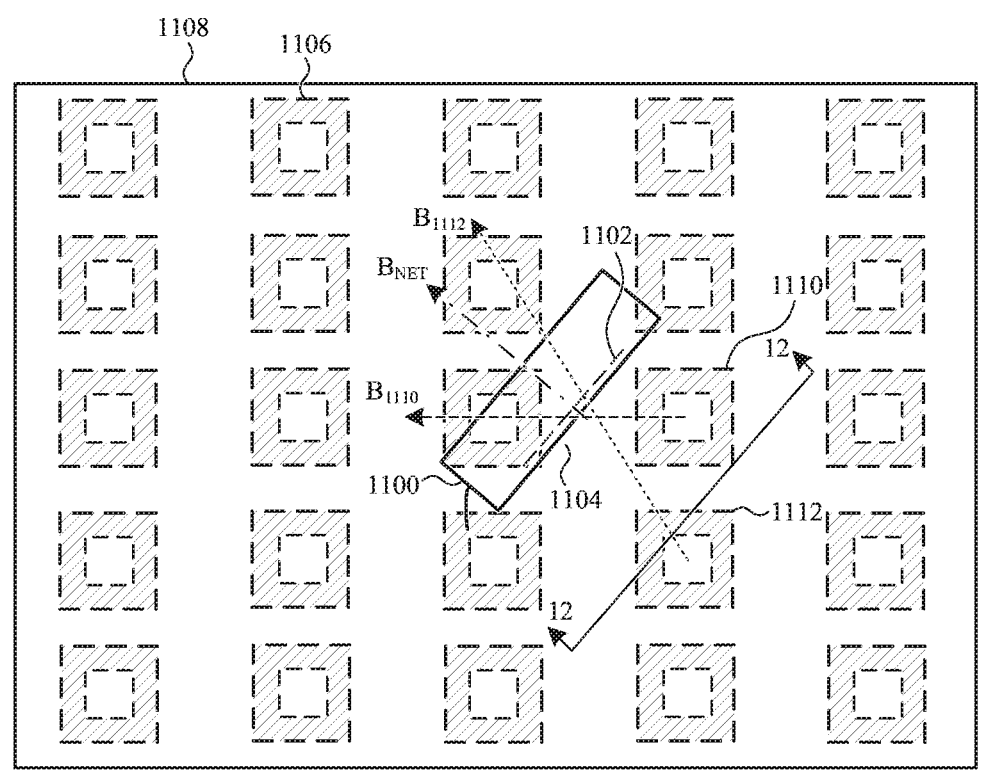
FIG. 11 shows a second plan view of a second charging surface with a second example receiver device positioned thereon.
Figure 12:
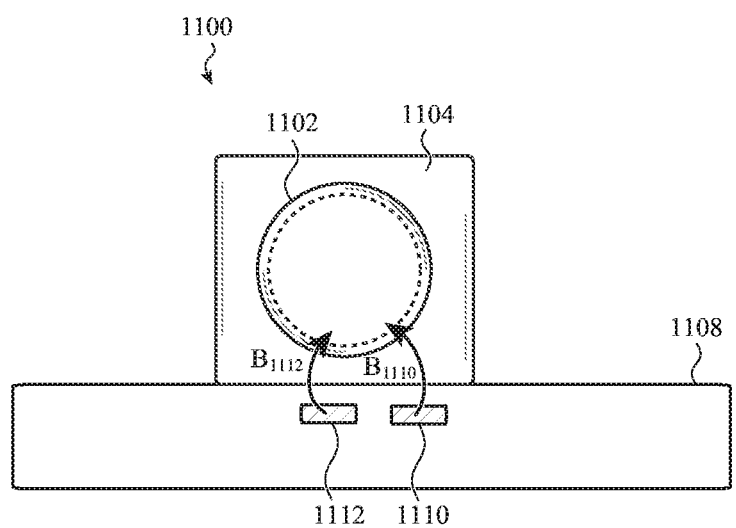
FIG. 12 shows a cross-sectional view of the charging surface taken along line 12-12 in FIG. 11.

FIG. 11 shows a second plan view of a second charging surface with a second example receiver device positioned thereon. FIG. 12 shows a cross-sectional view of the charging surface taken along line 12-12 in FIG. 11. With respect to FIGS. 11 and 12, the receiver device 1100 is depicted as a watch (shown transparent). A receiver coil 1102 (shown dashed) is positioned adjacent to a bottom surface 1104 of the receiver device 1100. Other embodiments can position the receiver coil 1102 at a different location within the receiver device 1100.

In the illustrated embodiment, the receiver device 1100 is positioned at an angle with respect to the rows and columns of discrete transmitter coils 1106. To transfer energy from the charging surface 1108 to the receiver coil 1102, the transmitter coils 1110, 1112 can be selected to receive AC drive signals. The transmitter coil 1110 contributes the magnetic field or flux $B_{1110}$ at the center of the receiver coil 1102. The transmitter coil 1112 contributes the magnetic field or flux $B_{1112}$ at the center of the receiver coil 1102. Neither magnetic field $B_{1110}$ and $B_{1112}$ is normal to the surface of the receiver coil 1102, so the transmitter coils 1110, 1112 do not transfer energy to the receiver coil 1102 efficiently. However, a net magnetic field $B_{NET}$ that is normal to the receiver coil 1102 is produced by summing the two magnetic fields $B_{1110}$ and $B_{1112}$ together. The magnetic field $B_{NET}$ transfers energy most efficiently to the receiver coil 1102 because the magnetic field $B_{NET}$ is normal to the receiver coil 1102.

Each magnetic field can be tailored to steer the net magnetic field toward the receiver coil 1102 by selecting one or more drive signal characteristics of each AC drive signal to produce a particular net magnetic field. As described earlier, the one or more drive signal characteristics can include (but are not limited to) the frequency, the phase, and the amplitude of each AC drive signal. For example, with respect to FIG. 11, The magnetic fields $B_{1110}$ and $B_{1112}$ can tailored by adjusting the relative amplitude of the current that flows through the transmitter coils 1110, 1112.

Figure 13:
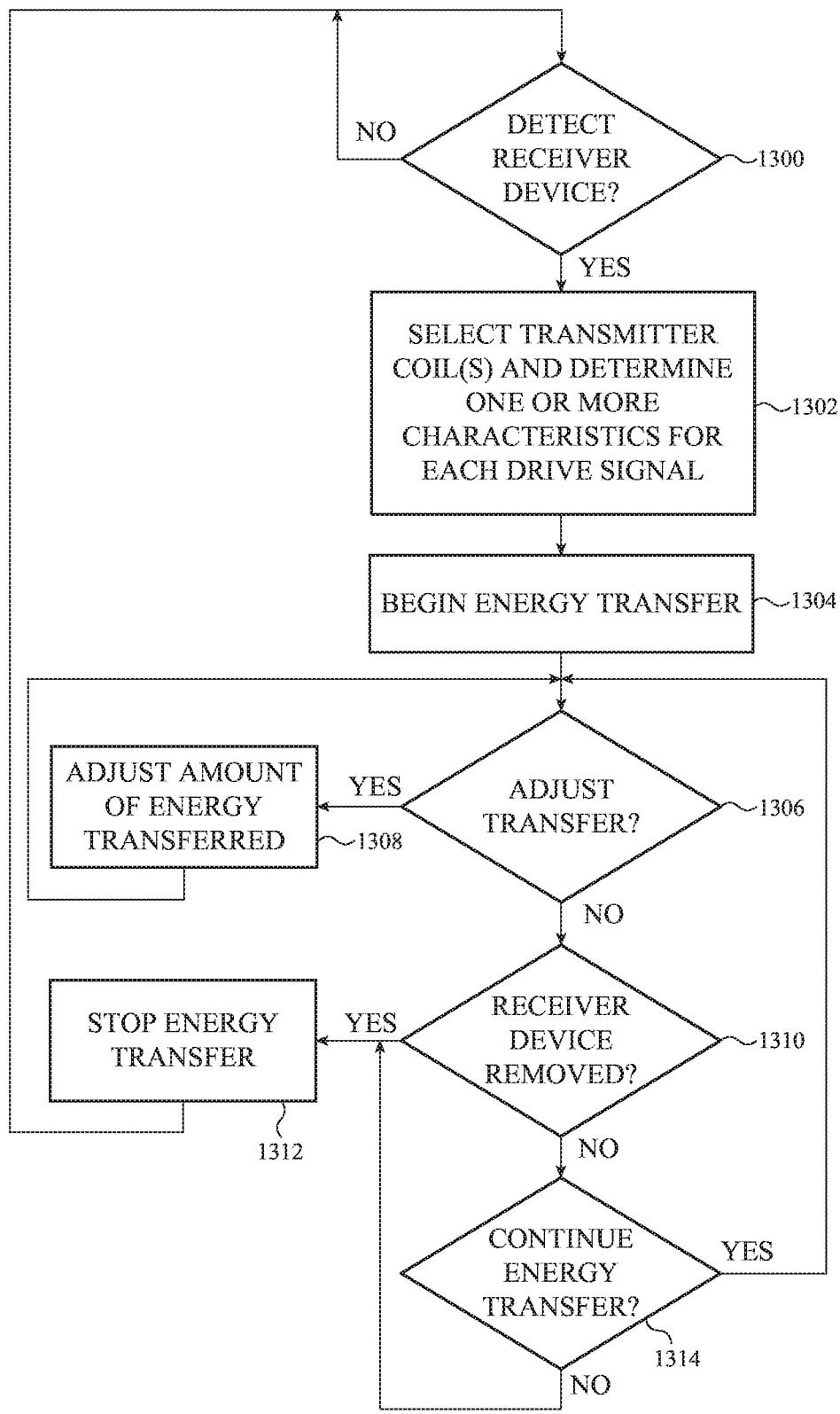
FIG. 13 shows a flowchart of a first method of operating a wireless transmitter device.

FIG. 13 shows a flowchart of a first method of operating a wireless transmitter device. Initially, a determination is made at block 1300 as to whether a receiver device is detected on a charging surface. The presence of a receiver device on the charging surface can be detected using various techniques. For example, in one embodiment a transmitter device can perform a grid search. An AC drive signal can flow through one or more transmitter coils associated with a particular section of the charging surface. If a receiver device is positioned in that section and a receiver coil begins to receive energy, the receiver device can transmit an acknowledgement signal to the transmitter device using a communication channel (e.g., communication channel 238 in FIG. 2). If an acknowledgement signal is not received by the transmitter device within a given period of time, an AC drive signal can flow through one or more transmitter coils associated with another section of the charging surface. The grid search can continue until an acknowledgement signal is received by the transmitter device.

Additionally, in some embodiments, the grid search can be a coarse search where once a given section is determined to have a receiver device nearby, the search can change to a fine search within that section. As one example, the number of transmitter coils that are receiving an AC drive signal can repeatedly be reduced and/or changed so that the section used for energy transfer becomes more effective at transferring energy. The fine search can continue until the transfer of energy to the receiver device is at a given efficiency. As one example, the transmitter coils that receive an AC drive signal can change such that the section used for energy transfer may shift and move closer to the receiver device. Additionally or alternatively, the transmitter coils that receive an AC drive signal can change such that the size of the excited section becomes smaller around the receiver device.

In some embodiments, the battery in a receiver device may not have a sufficient amount of charge to transfer an acknowledgement signal. Thus, when doing a grid search, the one or more transmitter coils associated with each section can receive an AC drive signal for an extended period of time. When a section near or below the receiver device is receiving AC drive signals, the extended period of time allows the battery in the receiver device to charge to a sufficient level that permits the receiver device to transmit the acknowledgement signal.

In another example embodiment, a transmitter device can include a detection layer (e.g., detection layer 302 in FIG. 3) that detects the presence of an object on the charging surface and the location of the object on the charging surface. The transmitter device may then apply an AC drive signal to one or more transmitter coils near the detected location to determine if the object is a receiver device. If a receiver device is positioned in that location and the receiver coil begins to receive energy, the receiver device can transmit an acknowledgement signal to the transmitter device using a communication channel (e.g., communication channel 238 in FIG. 2).

In some embodiments, a receiver device can transmit energy to the charging surface to inform the transmitter device of the presence and the location of the receiver device. One or more transmitter coils can couple with the receiver coil based on the transferred energy, allowing the transmitter device to determine the location of the receiver coil on the charging surface. Alternatively, a magnetic field gradient can be created across a section of the entire charging surface. A receiver device can transmit a signal to the transmitter device that indicates the voltage across the receiver coil. Based on the magnetic field gradient and the voltage across the receiver device, the transmitter device can determine a location of the receiver device on the charging surface.

In some embodiments, an exterior surface of a receiver device can include a pattern or design. A detection layer can include image sensors that capture an image of the pattern or design when the receiver device is proximate to or in contact with the charging surface. The location of the image sensor (s) that captured the image of the pattern or design can indicate the position of the receiver device on the charging surface.

Returning to FIG. 13, the process waits at block 1300 if a receiver device is not detected on the charging surface. When a receiver device is detected on the charging surface, the method passes to block 1302 where one or more transmitter coils are selected to receive an AC drive signal. Additionally, the drive signal characteristics of each AC drive signal are determined at block 1302. As discussed earlier, the drive signal characteristics of an AC drive signal may include (but are not limited to) the frequency, phase, and/or amplitude of the drive signal.

A respective AC drive signal is received by the one or more selected transmitter coils to begin energy transfer (block 1304). A determination may be made as to whether the transfer of energy is to be adjusted (block 1306). For example, the efficiency of the energy transfer may not be optimal or within the energy transfer requirements for the receiver device. If the transfer of energy is to be adjusted, the process continues at block 1308 where the amount of transferred energy is adjusted. As one example, the amount of transferred energy may be adjusted by modifying at least one drive signal characteristic of one or more AC drive signals.

If the transfer of energy will not be adjusted, the method passes to block 1310 where a determination is made as to whether or not the receiver device has been removed from the charging surface. If the receiver device is absent from the charging surface, the transfer of energy stops at block 1312. If the receiver device has not been removed from the charging surface, a determination can be made at block 1314 as to whether the transfer of energy is to continue. As one example, a battery in the receiver device may be charged completely. If the transfer of energy will continue, the method returns to block 1306. If the transfer of energy will not continue, the process passes to block 1312 where the transfer of energy ends. The method then returns to block 1300.

The method shown in FIG. 13 can be performed independently for each receiver device on the charging surface, which allows the transfer of energy to each receiver device to be tailored for that receiver device.

Other embodiments are not limited to the process order shown in FIG. 13. Some embodiments can rearrange the order and/or add or delete blocks. As one example, blocks 1306 and 1308 and/or block 1310 can be omitted in some embodiments.

Figure 14:
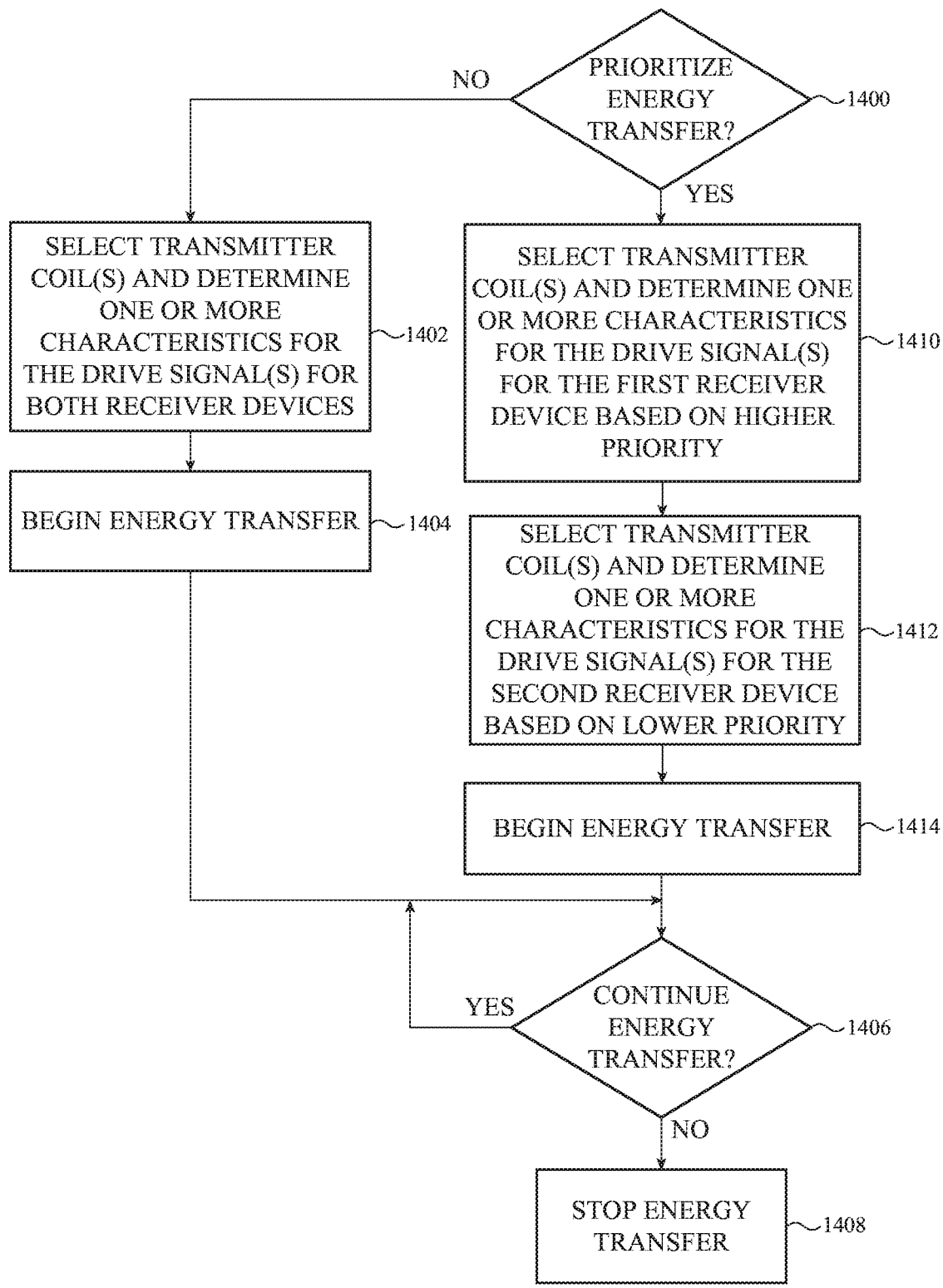
FIG. 14 shows a flowchart of a second method of operating a wireless transmitter device.

FIG. 14 shows a flowchart of a second method of operating a wireless transmitter device. Initially, as shown in block 1400, a determination may be made as to whether energy transfer from a transmitter device to two receiver devices is to be prioritized. As described earlier, energy transfer to multiple receiver devices may be prioritized based on one or more conditions of the receiver devices. For example, a first receiver device may receive energy, or receive a greater amount of energy, than a second receiver device because the charge level of the battery in the first device is lower than the charge level of the battery in the second device. Alternatively, a battery in a first receiver device may be a fast charging battery while the battery in the second receiver device is not a fast charging battery. The transmitter device may transfer energy to the first receiver device until the fast charging battery is fully charged, and once the fast charging battery is fully charged, begin transferring energy to the second receiver device. Alternatively, a user can prioritize his or her receiver devices so that when two receiver devices are on a charging surface of a transmitter device, the receiver device with the highest priority receives a greater amount of energy than the second receiver device.

If energy transfer will not be prioritized, the process passes to block 1402 where one or more transmitter coils are selected and one or more drive signal characteristics for the drive signal for each selected transmitter coil are determined for both receiver devices. The transmitter device then begins energy transfer to the receiver devices (block 1404). Thereafter, a determination may be made as to whether the transfer of energy to one or both receiver devices is to continue. As one example, a battery in one receiver device (or both receiver devices) may be charged completely. In another embodiment, a receiver device may transmit a communication signal to the transmitter device instructing the transmitter device to stop transferring energy (e.g., communication signal sent via communication channel 238 in FIG. 2).

The method waits at block 1406 if energy transfer continues. When the transfer of energy to one or both receiver devices will not continue, the method continues at block 1408 where the transfer of energy to one or both devices stops.

Returning to block 1400, if the transfer of energy will be prioritized, the process passes to block 1410 where one or more transmitter coils are selected and one or more drive signal characteristics for the drive signal for each selected transmitter coil are determined for the receiver device having the highest priority. Next, as shown in block 1412, one or more transmitter coils are selected and one or more drive signal characteristics for the drive signal for each selected transmitter coil are determined for the receiver device having the lower priority. The transmitter device then begins energy transfer to the receiver devices (block 1414). The amount of energy transferred to each device can be based on the priority of the receiver devices. For example, when the first receiver device has a higher priority than a second receiver device, the transmitter device can transfer a greater amount of energy to the first receiver device and a lesser amount of energy to the second receiver device for a given period of time (e.g., until a battery in the first receiver device is fully charged or has reached a threshold level of charge). The method then performs blocks 1406 and 1408.

Other embodiments are not limited to the process order shown in FIG. 14. Other embodiments can rearrange the order and/or add or delete some blocks. As one example, block 1412 may not be performed until the transfer of energy to the highest priority receiver device is complete, or has been in process for a given period of time (e.g., the battery in the first receiver device is fully charged or has reached a threshold level of charge). In other words, the transfer of energy to each receiver device may not be concurrent but can overlap or be performed sequentially based on the priority of a receiver device.

In some embodiments, a transmitter device may include multiple layers of transmitter coils. Including two or more layers of transmitter coils in a wireless transmitter device can provide a greater level of granularity when detecting the presence of a receiver device and/or may produce a higher coupling efficiency when coupling a magnetic field to a receiver coil. The transmitter coils in one layer can be shifted or offset from the transmitter coils in another layer. The shapes, locations, and sizes of the transmitter coils can vary within a single layer or within multiple layers. Each layer can be formed in or on a distinct substrate (e.g., printed circuit board) or multiple layers may be formed in one substrate. When multiple layers are formed in one substrate, an insulating material may be positioned between the layers of transmitter coils to electrically isolate one layer from the other layer.

FIGS. 15A-15B show one example of two layers of transmitter coils. A first layer 1500 of transmitter coils 1502 can be formed in or on a first substrate 1504. The transmitter coils 1502 in the first layer 1500 are arranged in a first pattern. A second layer 1506 of transmitter coils 1508 may be formed in or on a second substrate 1510. The transmitter coils 1508 in the second layer 1506 are arranged in a second pattern. In the illustrated embodiment, the first and second patterns are different and complement each other. As shown, the first pattern includes gaps where transmitter coils are not positioned. The transmitter coils in the second pattern are positioned at locations that correspond to the gaps in the first pattern.

Other embodiments can arrange the patterns differently. For example, the first and second patterns may be different and not complement one another. Additionally, at least some of the transmitter coils in one layer can overlap (fully or partially) at least some of the transmitter coils in another layer. Alternatively, the transmitter coils in the first and second layers may not overlap at all.

In other embodiments, the first and second patterns can be the same pattern and the transmitter coils in one layer (e.g., first layer 1500) can be offset from the transmitter coils in the other layer (e.g., second layer 1506). The offset can be limited in that at least a portion of the transmitter coils in one layer partially overlap at least a portion of the transmitter coils in the other layer. Alternatively, the offset may be sufficient so the transmitter coils in one layer do not overlap the transmitter coils in the other layer. In yet another example, the first and second patterns can be the same and the transmitter coils in one layer completely overlap the transmitter coils in the other layer.

In some embodiments, the first and second layers 1500, 1506 of transmitter coils 1502, 1508 can be formed in a single substrate. As described earlier, an insulating material may be positioned between the first and second layers 1500, 1506 of transmitter coils 1502, 1508 to electrically isolate one layer of transmitter coils from the other layer of transmitter coils.

Figure 16A:
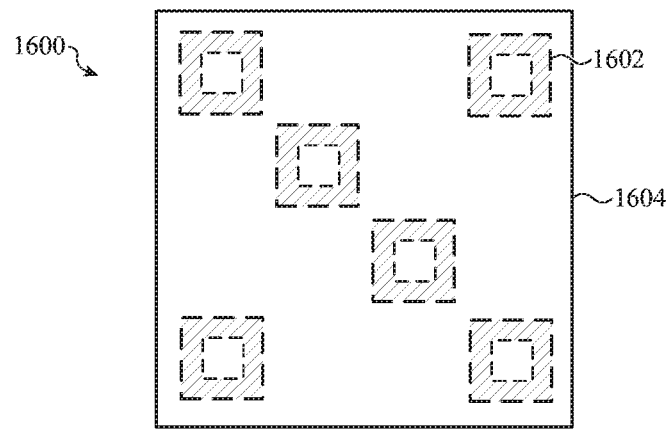
FIGS. 16A-C show one example of three layers of transmitter coils.
Figure 16B:
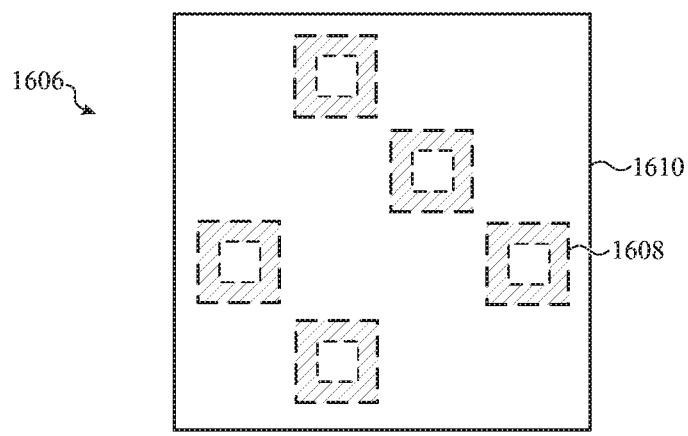
Figure 16C:
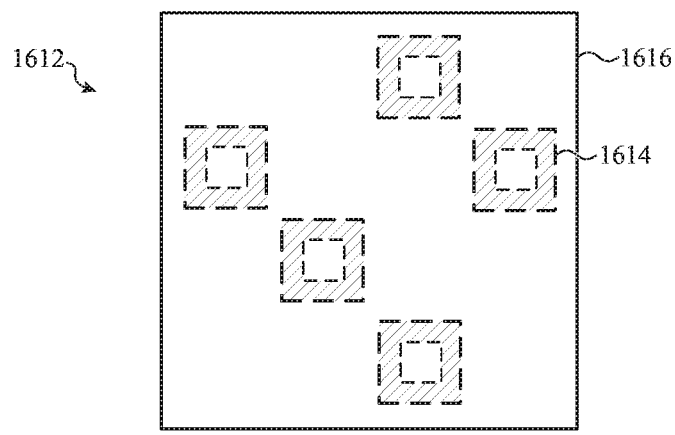

FIGS. 16A-C show one example of three layers of transmitter coils. A first layer 1600 of transmitter coils 1602 can be formed in or on a first substrate 1604. The transmitter coils 1602 in the first layer 1600 are arranged in a diagonal pattern. A second layer 1606 of transmitter coils 1608 may be formed in or on a second substrate 1610. The transmitter coils 1608 in the second layer 1606 are arranged in the same diagonal pattern but the transmitter coils 1608 in the second layer 1606 are offset from the transmitter coils 1602 in the first layer 1600.

A third layer 1612 of transmitter coils 1614 can be formed in or on a third substrate 1616. The transmitter coils 1614 in the third layer 1612 are arranged in the same diagonal pattern but the transmitter coils 1614 are offset from the transmitter coils 1602 in the first layer 1600 and from the transmitter coils 1608 in the second layer 1606.

Any suitable amount of offset can be used. For example, in one embodiment the transmitter coils 1602, 1608, and 1614 are sufficiently offset from one another so there is no overlap between the transmitter coils 1602, 1608, 1614 in the first, second, and third layers 1600, 1606, 1612. In the illustrated embodiment, the diagonal pattern includes gaps where transmitter coils are not positioned. The transmitter coils 1608 in the second layer 1606 are positioned at locations that correspond to the gaps in the diagonal pattern on the first layer 1600, and the transmitter coils 1614 in the third layer 1612 are positioned at locations that correspond to the gaps in the diagonal pattern on the first layer 1600 and on the second layer 1606.

Other embodiments can arrange the transmitter coils 1602, 1608, 1614 differently. For example, the transmitter coils 1602, 1608, 1614 may be assembled in the same pattern and positioned on the first, second, and third layers 1600, 1606, 1612 so at least a portion of the transmitter coils in at least one layer at least partially overlaps at least a portion of the transmitter coils in another layer. Alternatively, at least one layer of transmitter coils can be arranged in a pattern that differs from the pattern on another layer. In another example, the transmitter coils in the first, second, third layers can completely overlap one another.

In some embodiments, the first, second, and third layers 1600, 1606, 1612 of transmitter coils 1602, 1608, 1614 can be formed in a single substrate. As described earlier, an insulating material may be positioned between the first, second, and third layers 1600, 1606, 1612 of transmitter coils 1602, 1608, 1614 to electrically isolate the layers of transmitter coils from one another.

Other embodiments can arrange the transmitter coils differently. For example, the spacing between the transmitter coils in a layer or in multiple layers can be the same or can differ. Additionally or alternatively, two or more layers of transmitter coils can be formed as layers of transmitter coils in a single substrate. In such embodiments, an insulating material is positioned between the layers of transmitter coils to electrically isolate one layer from the other layer.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for operating a wireless transmitter device, the method comprising:
   detecting a position and an orientation of a receiver device on a charging surface of the wireless transmitter device, the position and the orientation of the receiver device such that a normal to a receiver coil of the receiver device is oriented at an angle away from perpendicular to the charging surface;
   selecting a first transmitter coil and a second transmitter coil in a plurality of transmitter coils based on the position and the orientation of the receiver device on the charging surface;
   providing a first drive signal to the first transmitter coil to generate a first magnetic field to transfer energy from the first transmitter coil to the receiver coil in the receiver device; and
   providing a second drive signal to the second transmitter coil to generate a second magnetic field to transfer energy from the second transmitter coil to the receiver coil;
   wherein the first and the second magnetic fields combine to produce a magnetic flux that is substantially normal to the receiver coil.

2. The method of claim 1, wherein the plurality of transmitter coils is arranged in a pattern.

3. The method of claim 2, wherein the plurality of transmitter coils is evenly spaced with respect to one another.

4. The method of claim 1, wherein the plurality of transmitter coils is formed in or on a printed circuit board.

5. The method of claim 1, further comprising:
   determining a first drive signal characteristic of the first drive signal associated with the first transmitter coil prior to providing the first drive signal to the first transmitter coil; and
   determining a second drive signal characteristic of the second drive signal associated with the second transmitter coil prior to providing the second drive signal to the second transmitter coil.

6. The method of claim 5, wherein determining the first and second drive signal characteristics of the first and the second drive signals comprises determining at least one of:
   a frequency;
   an amplitude; or
   a phase of the first and the second drive signals.

7. The method of claim 1, wherein the position of the receiver device on the charging surface is detected by a detection layer included in the wireless transmitter device.

8. The method of claim 7, further comprising ceasing transfer of energy to the receiver device based on the detection layer detecting an absence of the receiver device on the charging surface.

9. The method of claim 1, further comprising:
   determining that transfer of energy to the receiver device is to stop; and
   stopping transfer of energy to the receiver device.

10. The method of claim 9, wherein determining whether transfer of energy to the receiver device is to stop comprises determining whether a battery in the receiver device is completely charged.

11. A wireless transmitter device, comprising:
    a first substrate including a first plurality of transmitter coils arranged in a first pattern;
    a second substrate positioned below the first substrate and including a second plurality of transmitter coils arranged in a second pattern different from the first pattern;
    a third substrate positioned below the first substrate and including drive circuitry operably connected to the first plurality of transmitter coils and the second plurality of transmitter coils and configured to provide drive signals to the first plurality of transmitter coils and the second plurality of transmitter coils;
    a via formed from at least one of the first substrate or the second substrate to the third substrate to provide a conductive connector between at least one of the first or the second plurality of transmitter coils and the drive circuitry; and
    a processing device operably connected to the drive circuitry and configured to:
        select a transmitter coil in the first or the second plurality of transmitter coils based on a position of a receiver device on a charging surface of the wireless transmitter device; and
        cause the drive circuitry to provide a drive signal to the transmitter coil to transfer energy from the transmitter coil to a receiver coil in the receiver device.

12. The wireless transmitter device of claim 11, wherein:
    the processing device is further configured to determine a drive signal characteristic of the drive signal prior to causing the drive circuitry to provide the drive signal to the transmitter coil; and
    the drive signal characteristic comprises at least one of:
        a phase of the drive signal;
        a frequency of the drive signal; or
        an amplitude of the drive signal.

13. The wireless transmitter device of claim 11, further comprising:
    a detection layer configured to detect the position of the receiver device on the charging surface; and
    a ferrite sheet positioned between the first and the third substrates; wherein the via is formed from at least one of the first substrate or the second substrate through the ferrite sheet to the third substrate to provide the conductive connector between the first or the second plurality of transmitter coils and the drive circuitry.

14. The wireless transmitter device of claim 13, wherein the second substrate is positioned between the first substrate and the ferrite sheet.

15. The wireless transmitter device of claim 11, wherein:
    the transmitter coil in the first or the second plurality of transmitter coils is a first transmitter coil;
    the receiver device is a first receiver device;
    the position is a first position;
    the receiver coil is a first receiver coil; and
    the processing device is further configured to:
        select a second transmitter coil in the first or the second plurality of transmitter coils based on a second position of a second receiver device on the charging surface of the wireless transmitter device; and
        cause the drive circuitry to provide a second drive signal to the second transmitter coil to transfer energy from the second transmitter coil to a second receiver coil in the second receiver device.

16. The wireless transmitter device of claim 15, wherein:
    the processing device is further configured to determine a drive signal characteristic of the second drive signal prior to causing the drive circuitry to provide the second drive signal to the second transmitter coil; and the second drive signal characteristic comprises at least one of:
a phase of the second drive signal;
a frequency of the second drive signal; or
an amplitude of the second drive signal.

17. A wireless transmitter device, comprising:
a first substrate including a plurality of transmitter coils arranged in a pattern;
a second substrate positioned below the first substrate and including drive circuitry operably connected to the plurality of transmitter coils and configured to provide drive signals to the plurality of transmitter coils;
a via formed from the first substrate to the second substrate to provide a conductive connector between the plurality of transmitter coils and the drive circuitry; and
a processing device operably connected to the drive circuitry and configured to:
select a first transmitter coil and a second transmitter coil in the plurality of transmitter coils based on a position and an orientation of a receiver device on a charging surface of the wireless transmitter device, the position and the orientation of the receiver device such that a receiver coil of the receiver device is oriented at an angle away from perpendicular to the charging surface; and
cause the drive circuitry to:
provide a first drive signal to the first transmitter coil to generate a first magnetic field; and
provide a second drive signal to the second transmitter coil to generate a second magnetic field;
wherein the first and the second magnetic fields combine to produce a magnetic flux that is substantially normal to the receiver coil to transfer energy to the receiver coil.

18. The wireless transmitter device of claim 17, wherein the processing device is further configured to:
determine a first drive signal characteristic of the first drive signal associated with the first transmitter coil prior to providing the first drive signal to the first transmitter coil; and
determine a second drive signal characteristic of the second drive signal associated with the second transmitter coil prior to providing the second drive signal to the second transmitter coil.

19. The wireless transmitter device of claim 18, wherein determining the first and the second drive signal characteristics of the first and the second drive signals comprises determining at least one of:
a frequency;
an amplitude; or
a phase of the first and the second drive signals.

20. The wireless transmitter device of claim 17, further comprising a detection layer configured to determine the position of the receiver device on the charging surface.

* * * * *